Aug. 15, 1967  S. RAVIV ETAL  3,336,208
ELECTROLYTIC DISSOLUTION OF URANIUM FUEL ELEMENTS
Filed April 29, 1964
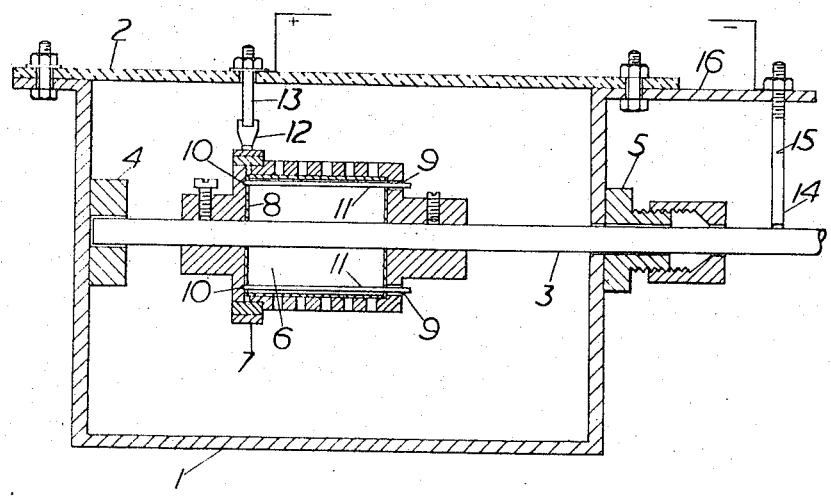
INVENTORS
SZMUEL RAVIV
IDDO LEVIN
Attorneys

United States Patent Office 3,336,208
Patented Aug. 15, 1967

3,336,208
ELECTROLYTIC DISSOLUTION OF URANIUM FUEL ELEMENTS
Szmuel Raviv and Iddo Levin, Beer Sheva, Israel, assignors to The State of Israel, Ministry of Defence, Hakirya, Tel Aviv, Israel
Filed Apr. 29, 1964, Ser. No. 363,405
Claims priority, application Israel, May 6, 1963, 19,162
2 Claims. (Cl. 204—1.5)

The present invention concerns an electrolytic process for the dissolution of spent uranium nuclear reactor fuel elements.

Uranium fuel elements comprise a core of pure uranium or a uranium alloy and, as a rule, an envelope of aluminum or aluminum alloy. In the source of the nuclear reactions occurring within the reactor, the uranium is gradually fissioned and after a certain time the concentration of the fission products in the fuel elements increases to such an extent that the elements are spent and have to be replaced. Spent uranium fuel elements are highly radioactive and their disposal constitutes a serious problem.

It is customary to disposed of spent uranium fuel elements by dissolution and working up the resulting solution for the separate recovery of uranium and various of the fission products. For this purpose the elements have first to be stripped of their envelope and this is conventionally done by immersing the element into a concentrated caustic soda or caustic potash solution for the complete dissolution of the envelope. Thereafter the remaining core is transferred into a 10–12 molar nitric acid solution heated to about 110° C., where it is dissolved.

This known process has a number of disadvantages. Thus during the removal of the envelope the rate and extent of dissolution can only be determined indirectly and with difficulty by measuring the quantity of liberated hydrogen or the heat of reaction. Moreover, the operation with concentrated nitric acid in the heat during the dissolution of the core results in a partial decomposition of nitric acid with the formation of various nitrogen oxides. It is accordingly necessary to provide special arrangements for the recuperation of the liberated nitrogen oxides and their reconversion into nitric acid. This renders the entire installation complicated and expensive. In addition, operation with concentrated nitric acid at elevated temperatures requires the use of special corrosion resistant equipment.

A further disadvantage of the conventional process resides in the fact that neither the dissolution of the envelope nor that of the core is controllable. Therefore, if for example, the dissolution of the core has to be interrupted for some reason at an intermediary stage this can only be done by flooding the vessel with so much water as to dilute the acid to such an extent that no further dissolution occurs. However, by so doing the solution becomes so diluted in respect of the already dissolved uranium and fission products that these can no longer be recovered and have to be considered as lost.

It is the object of the present invention to provide an improved process for the dissolution of uranium fuel elements which is controllable and which operates under less severe conditions.

The invention consists in a process for the dissolution of an uranium fuel element having an outer envelope of aluminum or aluminium alloy and a core of uranium or a uranium alloy, comprising the steps of establishing an electrolytic circuit in which the fuel element is the positive electrode and the electrolyte is an aqueous sodium hydroxide solution whose concentration does not exceed 15% by weight, initiating electrolytic dissolution by establishing a potential difference between anode and cathode that does not exceed 30 volts, allowing dissolution to proceed at this voltage for as long as a current flows through the system, then exchanging the alkaline solution for an aqueous nitric acid solution whose concentration is such that it does not dissolve the core chemically to any substantial extent and electrolytically dissolving the core in said nitric acid.

By keeping the concentration of the sodium or potassium hydroxide solution below 15% by weight and at the same time keeping the potential drop between cathode and anode below 30 volts during the first stage of electrolytic dissolution, it is ensured that only the envelope is dissolved during that stage and that the current flow stops automatically upon completion of the dissolution of the aluminum envelope while the core still remains unattacked. This is so because under these conditions the surface of the uranium is covered with an insulating layer of uranium oxide which remains unaffected and prevents the electrolytic dissolution of the uranium.

The electrolytic dissolution of the uranium core in the nitric acid is substantially independent of the concentration of the nitric acid. Because of this it is obvious that it will be preferable to operate with comparatively low concentrations at which no serious corrosion problems arise. It has been found that concentrations of 3 to 5 moles per litre are particularly suitable.

In the course of the electrolytic dissolution of both the envelope and the core, the fuel elements serve as anodes, while the electrode serving as cathode will be of a suitable inert material such as, for example, graphite, platinum or inoxidizable steel.

Both stages of the process according to the invention can be efficiently carried out at room temperature or if desired at a slightly elevated temperature, e.g. 40 to 50° C. It is thus seen that the operation conditions in the process according to the invention are incomparably less severe both as regards concentrations and temperatures as is the case in the conventional processes. Accordingly the nitric acid does virtually not decompose and the problem of recuperation does not arise. The problems of corrosion are equally much less severe than in the conventional process.

Moreover, since the concentration of the nitric acid is so selected that it does not dissolve the core chemically, the dissolution of the core is controllable and can be set on and off at will by starting and interrupting the current flow. Preferably the concentrations of the alkaline solution used for the dissolution of the envelope will also be selected so low that virtually no, or only very little, chemical dissolution occurs. In this way this stage too will be controllable in the same manner.

In the accompanying drawing, there is illustrated diagrammatically and in section a device by means of which spent uranium fuel elements can efficiently be dissolved in accordance with the invention.

The device here illustrated comprises a vessel 1 of plastic material fitted with a removable glass cover plate 2. Inside vessel 1 is a rotatable shaft 3 journalled at 4 and 5. Keyed on shaft 3 is a cylindrical perforated cage 6 made of insulating material, e.g. polyvinyl chloride. Near one end cage 6 is fitted with an outer platinum ring 7 while the interior of the perforated cage is lined with a platinum net 8 which is connected to ring 7 in such a way that electric current can flow from the former to the latter. In one of its end walls cage 6 comprises a number of bores 9 and at the opposite end wall a number of recesses 10 with each recess 10 being coordinated to and in register with one bore 9. The bores 9 and recesses 10 serve for holding uranium fuel element rods 11. When in cage 6, elements 11 are in contact with net 8.

The platinum ring 7 serves as collector and is associated with a gliding contact 12 provided at the end of a leaf spring 13 anchored in the cover plate 2 and adapted for connection to the positive pole of a D.C. source. In this manner net 8 and elements 11 serve during operation as anodes.

The shaft 3 serves as cathode. Its extension outside vessel 1 is associated with a gliding contact 14 fitted at the end of a leaf spring 15 anchored in a bracket 16 of vessel 1.

Shaft 3 is further adapted for coupling to a driving motor (not illustrated).

Vessel 1 is also fitted with means for the introduction and withdrawal of the alkaline and acidic solution. For simplicity of illustration these means are equally not illustrated.

When rods 11 are in position the device is first filled with an aqueous sodium hydroxide or potassium hydroxide solution so that the entire cage is submerged. The device is then connected to a D.C. source as specified and, at the same time, shaft 3 is revolved at a suitable speed. Current now flows and electrolytic dissolution of the outer envelope of elements 11 occurs. As soon as this dissolution is completed the current stops automatically and at this stage the alkaline solution is withdrawn from vessel 1 and in its stead a suitable nitric acid solution is introduced. The current flow is now renewed until completed dissolution of elements 11.

The following example illustrates the process according to the invention:

*Example*

A device as illustrated in the drawing was used being 40 cm. long, 20 cm. broad and 20 cm. high. The diameter of cage 6 was 6 cm. and its length 12 cm. Uranium fuel elements of 8 cm. length were placed in the cage. The core of the elements had a diameter of 1 cm. and was composed of 99.8% of U and 0.2% of C. The thickness of the envelope was 1 mm. and it consisted of 99.9% Al.

Vessel 1 was filled with a 15% w/w. aqueous NaOH solution and the cage was revolved at approximately 200 r.p.m. A current of 5-7 amp. was passed at 20° C. for 40 minutes at the end of which the current stopped and the dissolution of the envelope was completed.

The NaOH solution was removed and a 4 N aqueous $HNO_3$ solution was introduced into vessel 1. Electrolysis was continued for 3 hours at 20° C., at the end of which the uranium cores were completely dissolved.

We claim:

1. A process for the dissolution of an uranium fuel element having an outer envelope of aluminium, or aluminium alloy, and a core of uranium or a uranium alloy, comprising the steps of establishing an electrolytic circuit in which the fuel elements is the positive electrode and the electrolyte is an aqueous sodium or potassium hydroxide solution whose concentration does not exceed 15% by weight initiating electrolytic dissolution by establishing a potential difference between anode and cathode that does not exceed 30 volts, allowing dissolution to proceed at this voltage for as long as a current flows through the system, then exchanging the alkaline solution for an aqueous nitric acid solution whose concentration is such that it does not dissolve the core chemically to any substantial extent and electrolytically dissolving the core in said nitric acid.

2. Process according to claim 1, wherein the concentration of the nitric acid is within the range of 3 to 5 mole/litre.

References Cited

UNITED STATES PATENTS

| | | | |
|---|---|---|---|
| 2,120,478 | 6/1938 | Amundsen | 204—213 |
| 2,370,463 | 2/1945 | Herrick | 204—213 X |
| 2,446,418 | 8/1948 | Horn | 204—213 |
| 2,766,201 | 10/1956 | Luther | 204—213 |
| 2,834,722 | 5/1958 | McLaren et al. | 204—1.5 |
| 2,841,538 | 7/1958 | Porter et al. | 204—1.5 |

OTHER REFERENCES

Nuclear Science and Engineering, vol. 12 (1962), pp. 33, 34, 35, 36, 37.

REUBEN EPSTEIN, *Primary Examiner.*